Patented May 17, 1927.

1,629,461

UNITED STATES PATENT OFFICE.

WILLIAM H. BERG, OF SOUTH ORANGE, AND RAYMOND C. WHITMAN, OF CHATHAM, NEW JERSEY, AND ERNEST F. AAB, OF ASTORIA, NEW YORK, ASSIGNORS TO HEALTH PRODUCTS CORPORATION, OF NEWARK, NEW JERSEY, A CORPORATION OF NEW JERSEY.

CHEWING GUM.

No Drawing. Application filed April 22, 1926. Serial No. 103,969.

This invention relates to a new and improved chewing gum and to a method of manufacturing the same. More particularly, the invention relates to medicated chewing gum, that is, chewing gum containing medicinal or pharmaceutical preparations, such as laxatives, etc. A particularly valuable and advantageous embodiment of the invention is a laxative chewing gum containing phenolphthalein incorporated therein in a novel and advantageous manner.

According to the present invention, the phenolphthalein or other medicinal compounds, is first prepared in the form of small pellets which are made sufficiently firm or hard or are provided with a sufficiently hard coating to withstand intermixture with the chewing gum without disintegration or breaking up of the pellets; and these pellets are then intermixed with the chewing gum and distributed throughout the chewing gum in a substantially uniform manner and the chewing gum is then fabricated into pieces of the desired size. The chewing gum is also advantageously provided with a candy coating.

The pellets which are incorporated with the chewing gum may themselves be made in various ways, such as ways familiar to the manufacturer of pills and pellets. Instead however, of being soft such that they will readily crumble or disintegrate, they are made hard, or provided with a hard outer coating, so that they will not readily crush and disintegrate, but so that they will withstand handling and admixture with the chewing gum without objectionable disintegration. One method of making the pellets is to start with uniform crystals of sugar, say between No. 20 and No. 30 mesh, and build up the crystals to pellets of the required size in a rotating coating pan by the addition of phenolphthalein e. g. in one or another of its various forms and syrup and by evaporation of the water of the syrup. That is, during the building up operation the rotating granules are wet with small quantities of sugar syrup or water and as the phenolphthalein is added it adheres to the crystals and they are gradually built up during the rotating operation by the addition of the phenolphthalein. The granules may be produced in the cold or with heating, and when syrup is added, cold air or hot air can be blown into the rotating pan to assist in the evaporation of the water and the production of the granules. The granules may be given an outer coating or shell of sugar by applying syrup after the phenolphthalein is added and by continuing the building-up operation in this way.

Another method of forming the pellets is to form the phenolphthalein or other medicinal compound into a paste or plastic mass suitable for extrusion, then to extrude this mass and cut off the extruded mass into particles or pellets, then, after drying, place the particles thus formed in a rotating coating pan and applying syrup thereto with evaporation of the water and formation of a sugar coating of the desired thickness so that the pellets will withstand subsequent handling and use. The plastic mass containing the phenolphthalein, and which is extruded to form the granules, may be a paste containing phenolphthalein, glucose, gum arabic, etc., in suitable proportions to permit it to be extruded, and, upon subsequent drying, to form dried particles of proper size for subsequent coating. If the granules are themselves sufficiently hard without an added coating, the coating may be dispensed with, but otherwise it is advantageous to apply a hard outer coating to the granules to give them added hardness to withstand the mixing operation when they are mixed with the chewing gum.

The granules produced may vary somewhat in size, but this can readily be taken care of by sifting the granules and using those of uniform size, for example, a size of about $\frac{1}{16}$ inch in diameter or less; although it will be evident that the size of the granules or pellets can be varied somewhat and a somewhat larger or a somewhat smaller size employed. In general, it is advantageous in any particular batch of chewing gum and in commercial manufacture to use a substantially uniform size. Particles or pellets which are too large or too small can be ground up and used over again in the production of additional pellets.

In the manufacture of the new chewing gum, the chicle and other ingredients which go to make up the base of the chewing gum, are separately prepared and admixed and the chewing gum manufacture is carried to a point where the main manufacturing operation or cooking the mixture and incorporating most of the ingredients is completed, so that the incorporation of the pellets is at a stage of the manufacture near the end where the gum is subjected to a minimum of subsequent operations after the pellets are incorporated. This incorporation can advantageously be effected in the kettles after the ingredients are compounded and cooked and shortly before the mixture is to be emptied from the kettles. The pellets can then be added in desired amount and thoroughly incorporated with the gum by stirring or mixing. In this way the pellets can be distributed with substantial uniformity throughout the entire mass of gum. The pellets, as above noted, are advantageously sufficiently hard so that they are not crumbled or broken up during this mixing operation, but so that they retain their pellet form after admixture. The gum with the pellets incorporated therein can then be sheeted, scored, and subsequently treated, as by sugar coating, to form the finished chewing gum.

The invention will be further illustrated by the following specific description but the invention is not limited thereto.

The chewing gum base may be prepared as follows: Raw chicle is melted and filtered to remove moisture and foreign matter. The filtered chicle is again melted in conjunction with other resinous compounds. The mixture thus obtained is added to corn syrup in a steam jacketed mixer supplied with blades which rotate constantly during the entire operation. The corn syrup has previously been heated in the mixer by means of steam, which latter is shut off when the gum mixture is added. Gum scrap is next charged into the mixer and, when the scrap has melted, and the entire mass has been thoroughly mixed, sugar, the granules containing phenolphthalein, and oil of peppermint are added. The batch is then kneaded until uniformly mixed, that is, until the granules are uniformly distributed throughout the batch. It is then removed from the mixer and cut in the form of loaves or sheets for cooling. When sufficiently cooled, the loaves are put through the rolling and scoring machine. That is, the loaves when sufficiently cooled are fed into a hopper and forced by means of a worm screw drive through the hopper as a continuous strip or ribbon. This strip or ribbon of gum is carried between a series of metal rollers which compress the gum into the desired thickness and width. The resulting sheet is next passed to the scoring roller which cuts the gum into strips of proper width and then to the final roller consisting of a series of accurately placed rings which scores the separate strips of gum. The scored strips are placed upon sheets and are conditioned by permitting them to stand for a suitable period. The conditioned strips are fed into breaking machines with ringed rollers which score the gum at right angles to the original lengthwise scoring. The gum strip has now been scored in its final form and is then placed in a revolving pan which when rotated will break the gum up into small pieces suitable for use as centers in making coated chewing gum.

In making coated chewing gum, the gum centers, prepared as above described, are placed in revolving pans and are first dampened with a solution of sugar and gum arabic, or other suitable solution. A sprinkling of dry sugar serves to prevent sticking of the pieces of gum together and also tends to fill up the uneven spaces in the gum. Further drying of the added sugar solution is effected by a current of air. The above wetting operation, coupled with further additions of dry sugar, is repeated until the required size and color are reached. During the first wettings of the gum centers with the syrup, a portion of the oil of peppermint may be added, the remainder of the charge of oil being added during the last additions of syrup. Where other flavoring than peppermint is used, it may be similarly added. When the pieces have been coated to the desired extent, and have been colored if desired by the addition of suitable coloring, or by the use of a syrup with the coloring matter therein, they are set aside for thorough drying and are then ready for packaging.

It will be evident that different compounds may be employed for the chewing gum base, chicle being usually employed together with other gums and resins to give proper consistency. The cooking and mixing of the gum ingredients with glucose and with added sugar is advantageously completed before the granules or pellets are added; and these granules or pellets are added before the last addition of sugar, which is then added together with flavoring, and the chewing gum subjected to its final mixing operation to incorporate the added pellets in a substantially uniform and thorough manner.

The resulting chewing gum presents the advantage or substantial uniformity in the amount of phenolphthalein or other medicinal preparations which it contains for the reason that the pellets or granules employed can be made of uniform phenolphthalein content, and a definite amount of granules can be added for a definite weight of gum batch; and the pellets can then be distributed throughout the gum mass in a substantially uniform manner by the mixing operation. As a result, each piece of gum will contain substantially the same amount of phenolphthalein, only very small variations in phenolphthalein content being found upon investigation of successive batches and pieces of gum, so that, for practical purposes, the different pieces of gum will contain the same amount of phenolphthalein.

Furthermore, the finished gum will contain the phenolphthalein or other medicament in the form of discrete granules or pellets which, as the gum is chewed, will be broken and separated from the gum and incorporated with the saliva. The gum so obtained has been found to permit of ready ingestion of the medicament. It appears that when the gum, containing granules or pellets uniformly distributed therein, is chewed the teeth crush the granules so that they are exposed to the action of the saliva. In this manner, the individual granules or pellets are progressively crushed and exposed and made readily available. Further chewing crushes and opens up additional granules and exposes a relatively large mass of medicament as distinguished from a gum containing finely divided particles of mediament wherein each fine particle is surrounded and protected by a relatively large mass of gum.

The provision of an outer candy coating, together with the incorporation of the phenolphthalein in the gum centers in the form of granules, gives a composite product which, when chewed, will separate the outer candy coating at the same time that the granules are separated. That is, as a piece of gum with the outer candy coating is chewed, the candy coating will be crushed and broken up by the chewing, and this chewing will also break up and separate from the gum centers, the individual granules containing the phenolphthalein, so that the phenolphthalein can be readily separated in this way from the gum, or can for the most part be separated in this way during the preliminary period of chewing of the gum.

The present invention also presents advantages in manufacture, including reduction in cost of incorporation of the phenolphthalein and less difficulty in the sugar coating of the gum centers, as compared with the manufacture of coated gum where the phenolphthalein is added as a part of the coating immediately around the gum centers and before the final candy coating is added. The process also presents the advantage of substantially uniform distribution of the phenolphthalein throughout the gum centers, thus insuring a substantially uniform laxative action of different pieces of gum.

The invention is particularly advantageous for phenolphthalein because of its insoluble character, and can be similarly used with similar advantages in incorporating other insoluble medicinal preparations; although, in its broader aspect, the invention includes the incorporation of the medicament or pharmaceutical preparation into the gum in the form of discrete pellets irrespective of whether the compound employed is soluble or insoluble.

The incorporation of the medicinal or pharmaceutical preparation in the form of pellets has the advantage among others of protecting the material in the pellets from the high temperature of the gum, for the reason that the pellets are added shortly before the gum is removed from the mixer and cooled and the outer coating of the pellets serves to protect the inner portion thereof from being heated to an objectionably high temperature. Substances which would be injured or destroyed in their medicinal or other action by mixing them directly with the gum can be advantageously admixed in the form of pellets. This method of incorporation is advantageous for substances such as pepsin, etc. and an improved pepsin chewing gum can be made in this way, in which the pepsin has not been injured objectionably by exposure to elevated temperatures during the gum manufacture.

It will be evident that variations can be made in the method of manufacture of the pellets or granules as well as in their size, and also in the particular formula and composition of the chewing gum base and the specific procedure involved in the incorporation of the granules with the chewing gum base, without departing from the invention.

We claim:

1. A chewing gum comprising a chewing gum base having incorporated therein a medicinal preparation in the form of pellets distributed in a substantially uniform manner throughout the chewing gum base.

2. A chewing gum comprising a chewing gum base having incorporated therein small pellets containing phenolphthalein, said pellets being distributed throughout the chewing gum base in a substantially uniform manner.

3. A chewing gum comprising a chewing gum base having incorporated therein pellets containing phenolphthalein, said pellets having a hard outer surface and a softer interior.

4. The improvement in the manufacture of chewing gum which comprises incorporating in the chewing gum base small pellets having a sufficient hardness to resist crushing during the corporating operation, and, after such pellets have been uniformly incorporated with and distributed throughout the chewing gum base, forming the resulting gum into pieces of suitable size for chewing, the individual pellets so incorporated containing a medicinal or pharmaceutical preparation.

5. The improvement in the manufacture of chewing gum which comprises incorporating in the chewing gum base small pellets having a sufficient hardness to resist crushing during the corporating operation, and, after such pellets have been uniformly incorporated with and distributed throughout the chewing gum base, forming the resulting gum into pieces of suitable size for chewing, the individual pellets so incorporated containing phenolphthalein.

In testimony whereof we affix our signatures.

WM. H. BERG.
RAYMOND C. WHITMAN.
ERNEST F. AAB.